US009284937B2

(12) United States Patent
Smith et al.

(10) Patent No.: US 9,284,937 B2
(45) Date of Patent: Mar. 15, 2016

(54) METHOD FOR MANUFACTURING ENGINE COVER HAVING A RETAINER TO SECURE AN ENGINE ACCESSORY

(75) Inventors: Thomas Edward Smith, Livonia, MI (US); Frank Acierno Valencia, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 235 days.

(21) Appl. No.: 13/560,407

(22) Filed: Jul. 27, 2012

(65) Prior Publication Data

US 2012/0291745 A1 Nov. 22, 2012

Related U.S. Application Data

(62) Division of application No. 12/496,132, filed on Jul. 1, 2009, now Pat. No. 8,256,395.

(51) Int. Cl.

| | |
|---|---|
| ***F02B 77/00*** | (2006.01) |
| ***B29C 65/06*** | (2006.01) |
| ***F02P 13/00*** | (2006.01) |
| ***F01L 1/344*** | (2006.01) |
| ***F01L 9/02*** | (2006.01) |
| ***F01L 9/04*** | (2006.01) |
| ***F01L 13/00*** | (2006.01) |
| ***F02F 7/00*** | (2006.01) |

(52) U.S. Cl.

CPC ................. *F02P 13/00* (2013.01); *F01L 1/344* (2013.01); *F01L 9/025* (2013.01); *F01L 9/04* (2013.01); *F01L 13/0015* (2013.01); *F02F 7/006* (2013.01); *F01L 2101/00* (2013.01); *F01L 2103/00* (2013.01); *F01L 2103/01* (2013.01); *F01L 2820/041* (2013.01); *Y10T 29/49231* (2015.01)

(58) Field of Classification Search

CPC . F02F 2007/0075; F02F 11/00; F02F 7/0065; F02P 13/00; Y10T 29/49231; Y10T 29/49297; B21K 1/26

USPC .............. 123/195 C, 195 R, 90.38; 156/73.5; 29/888.01, 888.06; 403/408.1, 326

See application file for complete search history.

(56) References Cited

U.S. PATENT DOCUMENTS 3,493,150 A * 2/1970 Crane et al. .................. 222/480
4,236,638 A 12/1980 Griffith
4,304,523 A 12/1981 Corsmeier et al.
4,478,443 A * 10/1984 Erwin ...................... 292/307 R (Continued)

OTHER PUBLICATIONS

Sunex Tool (SunexTool.pdf), http://www.sunextools.com/index.cfm?s=detail&subcat=153&item=759.*

*Primary Examiner* — Lindsay Low
*Assistant Examiner* — Long T Tran
(74) *Attorney, Agent, or Firm* — Julia Voutyras; Brooks Kushman P.C.

(57) ABSTRACT

A cover has an aperture through which an accessory gains access to the interior side of the cover and a cavity. The accessory may be any kind of sensor or actuator. To secure the accessory to the cover, an adapter coupled to the cover is provided. In one example, the adapter has a cylindrical connection section that is spin welded into place in the cavity. In another example, the adapter has self-tapping threads that engage with the surface surrounding the cavity. The adapter also has tabs extending outwardly from the cover, the tabs having a proximate section and an engagement section. The accessory has a retaining orifice that couples with the tabs in a snap-fit relationship to secure the accessory to the cover.

12 Claims, 7 Drawing Sheets

(56) References Cited

U.S. PATENT DOCUMENTS

| | | | | |
|---|---|---|---|---|
| 4,721,485 | A * | 1/1988 | Suzuki | 440/77 |
| 4,898,493 | A | 2/1990 | Blankenburg | |
| 5,957,100 | A * | 9/1999 | Frohwerk et al. | 123/90.38 |
| 6,427,674 | B1 * | 8/2002 | Wylin | H01T 13/44<br>123/634 |
| 6,454,137 | B1 * | 9/2002 | Sturk | 222/189.09 |
| 6,609,508 | B2 * | 8/2003 | Sexton | F16B 21/06<br>123/634 |
| 6,698,966 | B2 | 3/2004 | Hilton et al. | |
| 7,007,674 | B2 | 3/2006 | Streb et al. | |
| 7,168,879 | B2 | 1/2007 | Bertram et al. | |
| 7,185,639 | B1 * | 3/2007 | Roche et al. | 123/516 |
| 7,226,233 | B2 * | 6/2007 | SuBenbach | F16B 21/186<br>403/122 |
| 7,301,432 | B1 * | 11/2007 | Smith | 337/186 |
| 7,554,232 | B2 * | 6/2009 | Regnard et al. | 310/71 |
| 7,690,730 | B2 * | 4/2010 | Yasuda | B60N 2/40<br>297/195.11 |
| 8,065,983 | B2 | 11/2011 | Smith et al. | |
| 2004/0014377 | A1 * | 1/2004 | Yasuda et al. | 440/76 |
| 2007/0031185 | A1 * | 2/2007 | Bertram | F16B 21/075<br>403/122 |
| 2010/0135721 | A1 | 6/2010 | Ramsauer | |

* cited by examiner

METHOD FOR MANUFACTURING ENGINE COVER HAVING A RETAINER TO SECURE AN ENGINE ACCESSORY

CROSS-REFERENCE TO RELATED APPLICATIONS

This application is a division of, and claims the benefit under 35 U.S.C. §120 of, U.S. application Ser. No. 12/496,132 filed Jul. 1, 2009, now U.S. Pat. No. 8,256,395, the disclosure of which is hereby incorporated by reference in its entirety.

TECHNICAL FIELD

The present development relates to retaining ignition coils or other engine accessories on covers of internal combustion engines.

BACKGROUND

Spark-ignition engines typically have one spark plug/ignition coil per cylinder. The spark plug is typically threaded into the cylinder head through an aperture in the cam cover. The ignition coil is assembled over the tip of the spark plug that extends away from the combustion chamber. The ignition coil has a boss that defines an orifice through which a threaded fastener engages the cam cover to retain the coil in place. In some cases, a fastener may be inserted into a tapped hole in the cam cover. The threaded fastener and threaded plug are more costly and necessitate additional parts for each cylinder of the engine.

U.S. Pat. No. 6,609,508 B2 discloses a U-shaped retaining clip for attaching an ignition coil assembly to a cam cover. This design obviates the need for a threaded fastener. However, it requires a modification of existing cam covers and requires that the ignition coil engage the U-shaped retaining clip which necessitates a change in the design of the coil. Furthermore, no servicing procedure is disclosed in the event that one of the plastic elements fails, for example, during maintenance operations.

The above limitations and disadvantages are addressed by the present development as summarized below.

SUMMARY

An assembly for an internal combustion engine includes a cover having a cylindrical cavity and an adaptor coupled to the cover at the cylindrical cavity. The adapter has a connection section that couples with the cover and tabs that extend from the connection section. In one embodiment, the connection section is generally cylindrical along an axis. The tabs extend in a direction generally parallel to the axis. The tabs have a proximate section closer to the connection section and an engagement section away from the connection section. In one embodiment, the connection section is a cylinder that fits into the cylindrical cavity of the cover. By rotating the adapter, the connection section rubs against the cover surface at the cylindrical cavity. The relative motion causes melting of the two surfaces. Upon cooling, they are combined together. In another embodiment, the connection section has self-tapping threads with a major diameter greater than the diameter of the cylindrical cavity and a minor diameter less than the diameter of the cylindrical cavity. By rotating the adapter with respect to the cover, the self-tapping threads engage with the surface adjacent to the cylindrical cavity. The cylindrical and self-tapping adapters can be provided with a drive feature at an end of the connection section closer to the tabs of the adapter. The drive feature provides a key way into for a tool to engage with the adapter to apply the installing torque.

An advantage of the present disclosure is that an existing cover can be fitted with an adapter having tabs. Another advantage is that the total part count is reduced. According to a prior art example, to mount each accessory, a threaded fastener, brass insert, and aluminum insert is used. According to an embodiment of the present disclosure, an adapter is required. Furthermore, after assembling the adapter to the cover, the adapter is integrated with the cover. Thus, the opportunity to misplace parts when performing a maintenance operation is obviated.

DETAILED DESCRIPTION

An internal combustion engine may have one or two cylinder heads which form the upper portion on the combustion chamber for three to six cylinders depending on whether the engine is configured as an I-4, I-6, V-6, or V-8 engine. Intake and exhaust valves permit fresh air to enter the combustion chambers and exhaust to exit the combustion chambers are actuated by a valvetrain mechanism in the cylinder head. A cover encloses and seals the valvetrain from the outside. The cover is generally referred to as a valve cover with reference to either a cam-in-block or an engine with an overhead camshaft. The term "cam cover" used herein applies to what is commonly referred to as: a valve cover, a rocker arm cover, or a cam cover.

Figure 1:
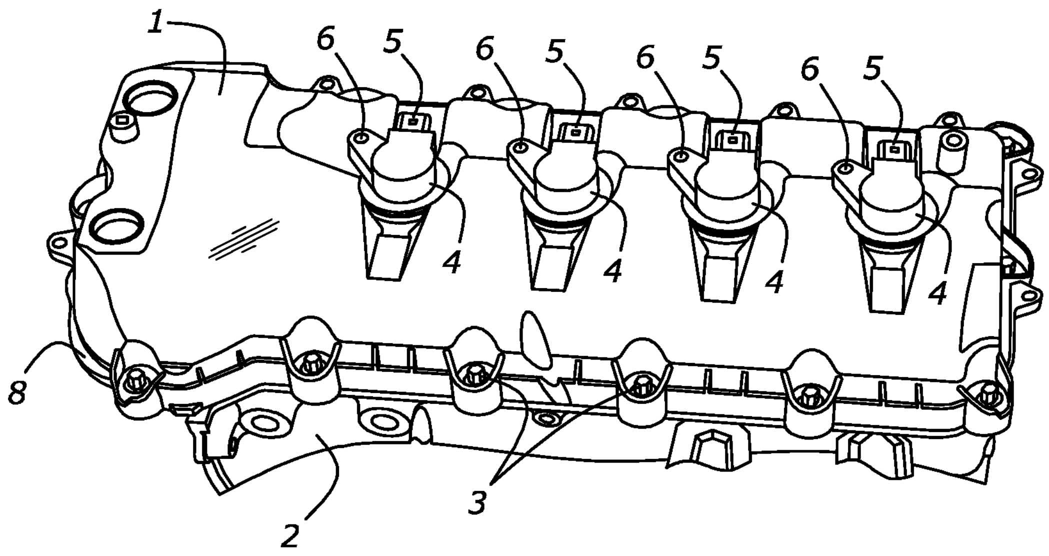
FIG. 1 is a view of a fragmentary perspective a cylinder head with a cam cover through which several coils are installed.

Referring to FIG. 1, a cam cover 1 is mounted on cylinder head 2 via fasteners 3. Ignition coils 4 protrude through cam cover 1 through apertures defined in cam cover 1. Ignition coils 4 couple with spark plugs (not visible) mounted in cylinder head 2. Ignition coils 4 have connectors 5 provided for making electrical connection to ignition coils 4. Ignition coils 4 also have bosses 6 extending outwardly from ignition coils 4 with retaining orifices 7 defined in bosses 6 for securing ignition coils 4 to cam cover 1. Cam cover 1 seals a non-combustion side 8 of cylinder head 2, keeping lubricant for the rocker arms and other moving parts within the space between cylinder head 2 and cam cover 1.

Figure 2:
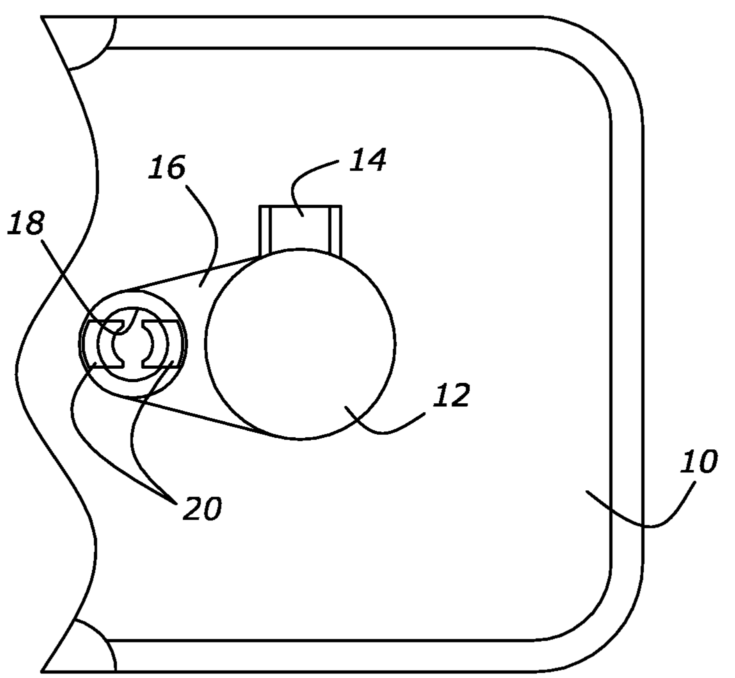
FIG. 2 is a fragmentary, plan view of the cam cover showing an installed coil.

Referring to FIG. 2, a cam cover 10 is shown with an installed coil 12 according to one embodiment of the present disclosure. Coil 12 has a connector receptacle 14 to which a wiring connector may be connected. Coil 12 has a boss 16 that defines an orifice 18. Tabs 20 extend outwardly from cam cover 10 through orifice 18 to retain coil 12.

Figure 3:
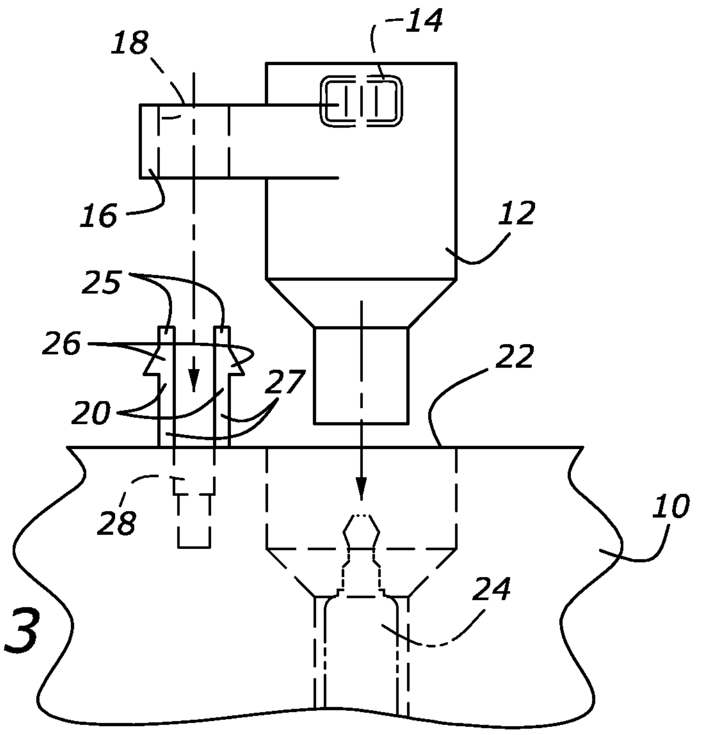
FIG. 3 is a fragmentary, elevation view of the cam cover and an uninstalled coil.

Referring to FIG. 3, coil 12 is aligned with, but not installed on cam cover 10. Cam cover 10 defines an aperture 22 through which a spark plug 24 is installed. Coil 12 fits over spark plug 24 as orifice 18 is fitted over tabs 20. The distance between centerlines of coil 12 and orifice 18 is the same as the distance between the centerline of aperture 22 and the center of tabs 20.

When properly aligned, coil 12 engages spark plug 24 as orifice 18 engages tabs 20. When orifice 18 is first brought into contact with tabs 20, orifice 18 slides over distal sections 25 of tabs 20. As orifice 18 of boss 16 is lowered further, orifice 18 engages a ramp of engagement section 26 of tabs 20 and can be lowered no further without tabs 20 moving. By applying a force on boss 16, tabs 20 bend toward each other to fit through orifice 18. When orifice 18 of boss 16 clears engagement section 26 of tabs 20, tabs 20 return to their original, undeformed, vertical position when orifice 18 engages body sections 27 of tabs 20. A radially extending surface 28 holds boss 16 and coil 12 in place on cam cover 10

Figure 4:
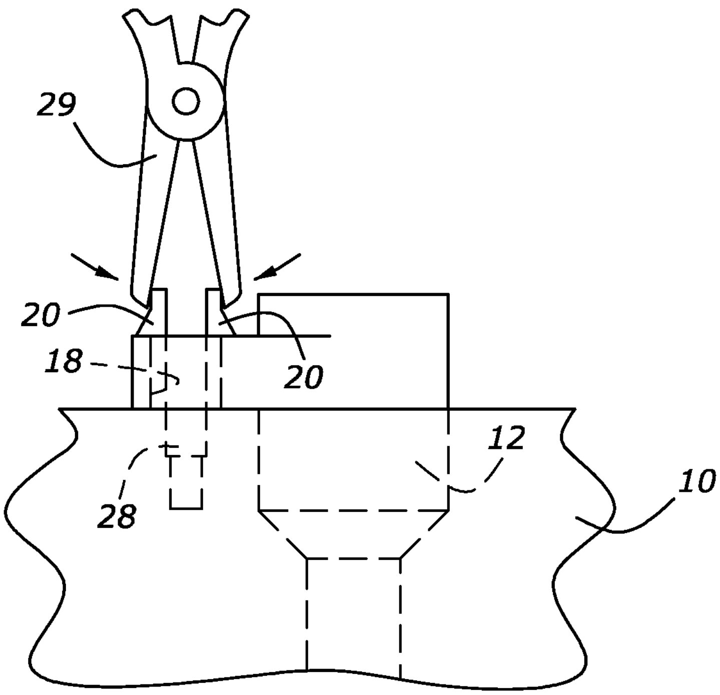
FIG. 4 is a fragmentary, elevation view of the cam cover and an installed coil.

Continuing to refer to FIG. 3, tabs 20 are of constant cross section along the length of distal sections 25. Proceeding further down the length, the cross section increases along engagement sections 26, in one embodiment the cross section increases monotonically in a direction toward cam cover 10. As shown in FIG. 4, engagement sections 26 appear to increase in width linearly along the length, i.e., forming a ramp. This is a non-limiting example. In one embodiment, engagement sections 26 have a feature to facilitate grabbing the tabs with a tool so that they can be squeezed together for removal of the coil or other engine accessory. In embodiments with such a grabbing feature on engagement section 26, distal section 52 may be omitted. Engagement sections 26 may be any shape, i.e., which allows orifice 18 to be guided over tabs 20 and then snap back after orifice 18 clears engagement sections so that the coil or other accessory is secured in place. Proximate section 27 has a constant cross section with the outside dimension being about the same or slightly less than the inside dimension of orifice 18. The length of body section 27, indicated as L in FIG. 3, is at least as long as the height of boss 16, indicated at H in FIG. 3, so that engagement sections 26 clear boss and snap to their original vertical shape to hold boss 16 in place.

Figure 5:
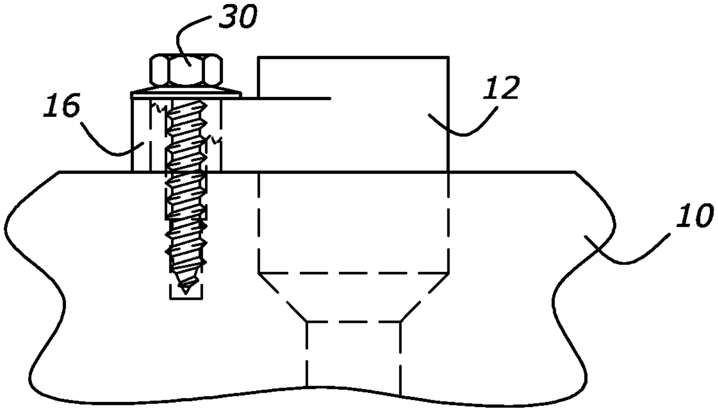
FIG. 5 is a fragmentary, elevation view of the cam cover and an installed coil showing an alternative embodiment including a service repair part.

In FIG. 4, an installed coil is shown. According to an embodiment of the present development, removal of coil 12 or spark plug 24 requires the removal of boss 16 from tabs 20. A pliers 26 can be used to push tabs 20 together while pulling up on coil 12 for removal. When coil 12 is removed, spark plug 24 can be accessed. When removing coil 12, tabs 20 may be damaged or broken. If the tabs are found inadequate to retain coil 12, a service fix, as shown in FIG. 5, includes a self-tapping screw 30. At least distal section 25 and engagement section 26 of tabs 20 are removed to accommodate self-tapping screw 30. Cavity 28, provided in cam cover 10 to accommodate self-tapping screw 30, can be seen in FIGS. 3 and 4.

Figure 6:
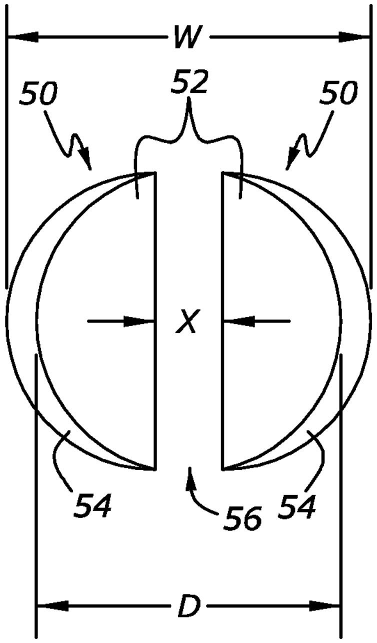
FIG. 6 is a plan view of tabs according to an alternative embodiment in an unsqueezed configuration.
Figure 7:
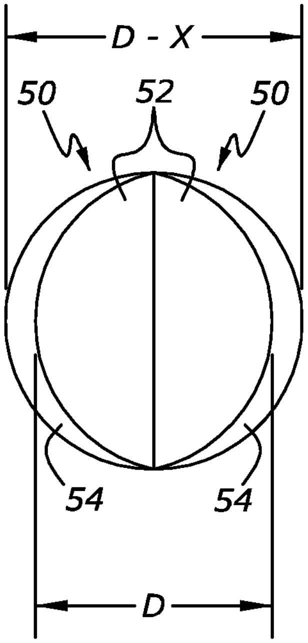
FIG. 7 is a plan view of tabs according to an alternative embodiment in a squeezed configuration.
Figure 8:
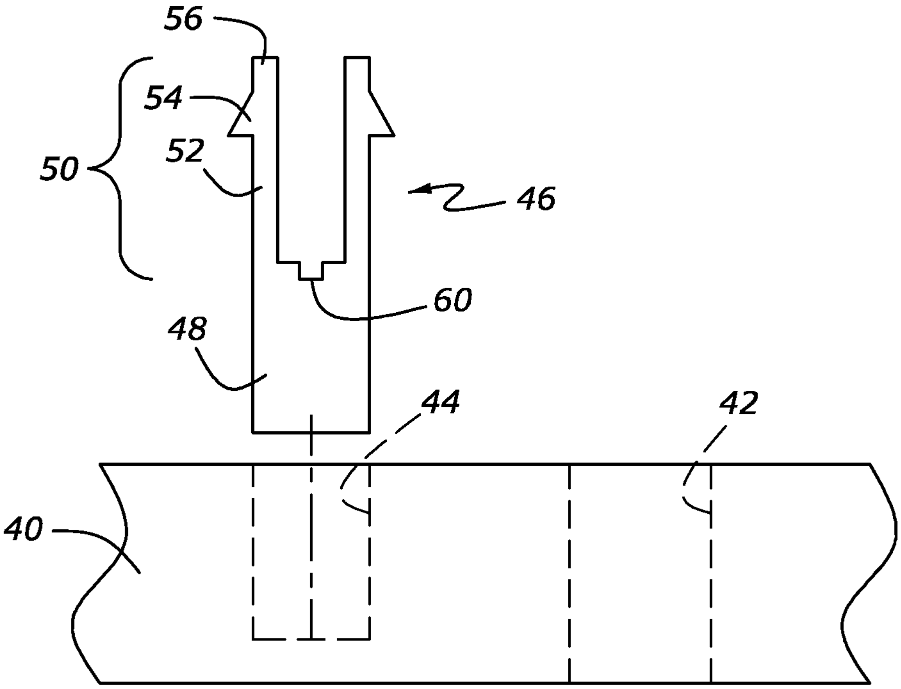
FIG. 8 is a fragmentary, elevation view of a cover and an adapter, the adapter being uninstalled.

Plan views of one alternative embodiment of tabs 50 are shown in FIGS. 6 and 7. In FIG. 7, tabs 50 are in an unsqueezed state, in which a gap of X exists between the two tabs 50. The distal section 52 has a diameter equal to or slightly less than D, the diameter of the orifice 56 with which tabs 50 engage. Tabs 50 also have engagement sections 54, which, as shown in FIG. 7, have a broadest dimension from the edge of one tab to the other of W. In FIG. 8, the tabs are shown squeezed together. In such a configuration, a width of the outside edges of engagement sections 54 is D or less so that engagement sections 54 can be placed over an orifice of diameter D. As squeezed together, the width of the two distal sections 52 is D minus X.

In FIG. 3, coil 12 is engaged with spark plug 24 and retaining orifice 18 of boss 16 couples with tabs 20. According to other embodiments of the disclosure, other accessories can be coupled with tabs similar to tabs 20, but supplied at a different location on the cam cover or on any engine cover. Engine accessory may be one of: a camshaft position sensor, a variable valve timing actuator, and a valve lift actuator. In such a case, an aperture is provided for an operative end of the accessory to gain access inside the cam cover.

Embodiments of the present disclosure in which the tabs are integral with the cover is appropriate for situations in which the mold for the cover is being newly designed or redesigned. However, in the middle of a production run, redesigning the mold to integrate the tabs may be prohibitively expensive. Thus, according to an alternative embodiment, shown in FIG. 8, cover 40 having an aperture 42 to provide access for an accessory and having a cylindrical cavity is coupled with an adapter 46. Cover 40 may be a cover of the prior art in which cylindrical cavity 44 might have been fitted with a brass insert so that a conventional bolt could be used to secure the accessory. According to the present development, adapter 46 has a connection section 48 having a diameter roughly equal to the diameter of cylindrical cavity 44. Adapter 46 has tabs 50 which include proximate section 52, engagement section 54, and distal section 56. Defined in the top of connection section 48 is a drive feature 60. In the embodiment of FIG. 8, the drive feature is a flathead key. Alternatively, drive feature 48 may be keyed to permit it to mate with other known drivers, such as Allen, TORX, Philips, etc.

Figure 9:
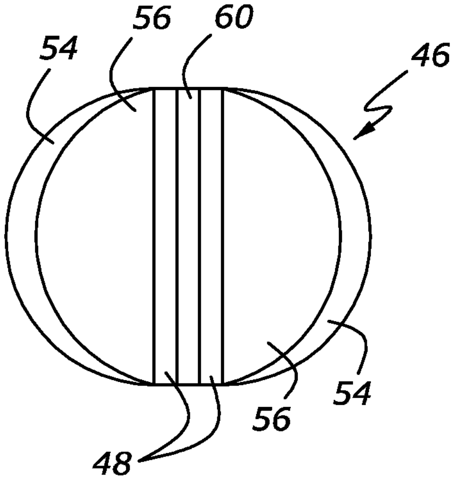
FIG. 9 is a plan view of the adapter showing an example drive feature.
Figure 10:
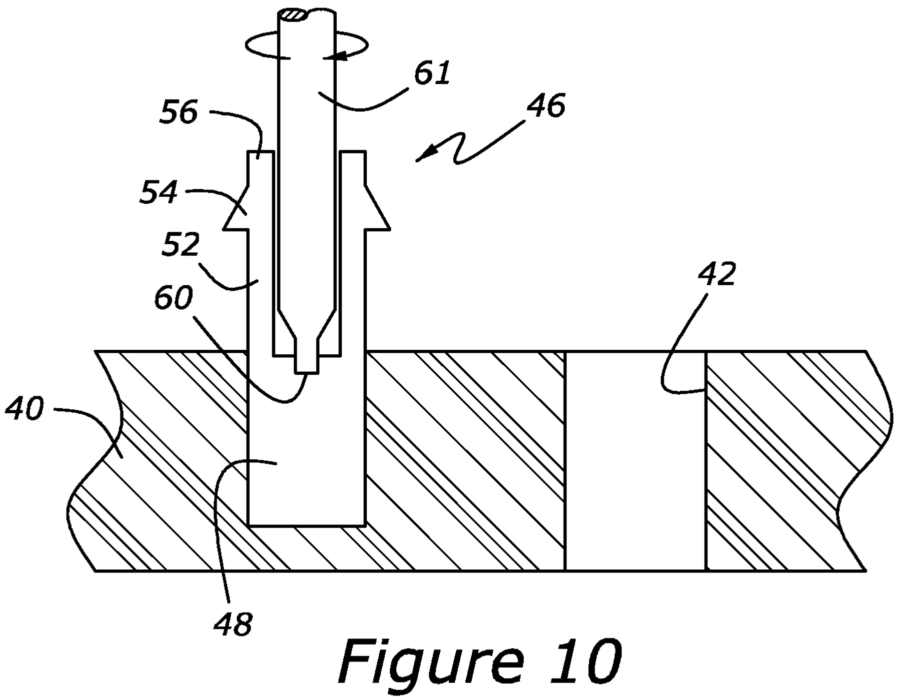
FIG. 10 is a cross-sectional view of a cover and an adapter with a tool coupled to the drive feature of the adapter.

A plan view of adapter 46 is shown in FIG. 9 in which distal section 56 and engagement section 54 can be viewed. Connection section 48 has a groove (or key) 60 defined in an end closest to the tabs. In FIG. 10, adapter 46 is slid into cylindrical cavity of cover 40 and a tool 61 is inserted in groove 60. A torque applied to tool 61 is transmitted through groove 60 to rotate adapter 46. By rotating adapter 46 with respect to cover 40, frictional forces causes the rubbing surfaces to heat up and melt. Upon cooling, adapter 46 is coupled with cover 40. This process is commonly known as spin welding. The coupled adapter 26 and cover are shown in FIG. 11.

Figure 11:
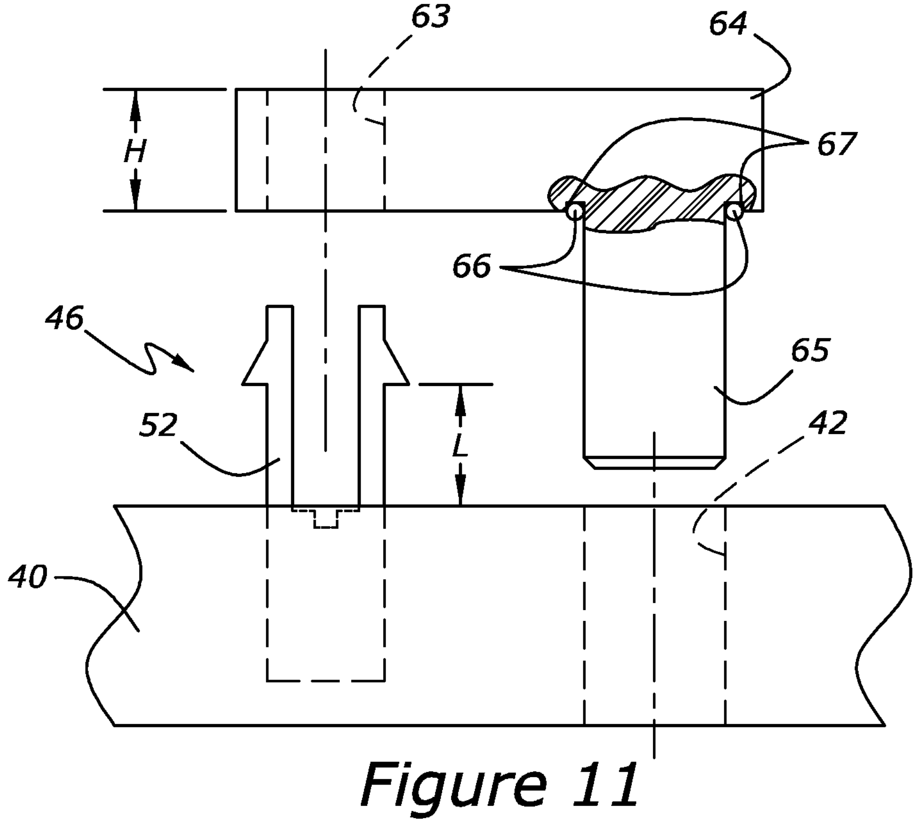
FIG. 11 is a fragmentary, elevation view of a cover with an installed adapter.
Figure 12:
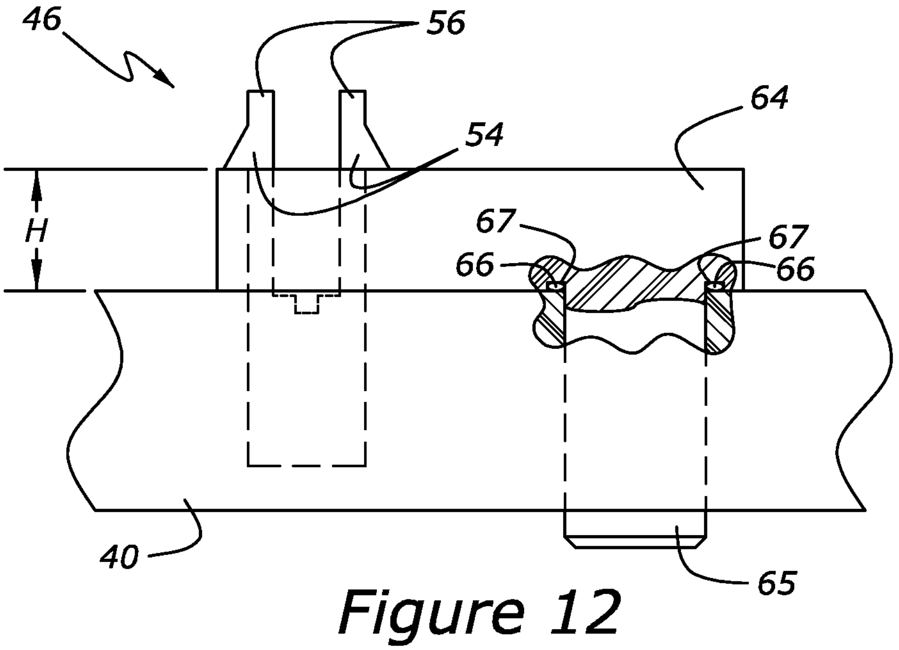
FIG. 12 is a fragmentary, elevation view of a cover with an installed adapter and a accessory coupled with tabs of the adapter.

Also shown in FIG. 11 is that proximate section 52 extends outwardly from cover 40 is length, L. Accessory 64 has height H, at least in the vicinity of retaining orifice 63. Accessory 64 is held in place by engagement sections 54 of adapter 46 by sliding retaining orifice 63 over adapter 46. Referring now to FIG. 12, accessory 64 is shown installed on cover 40. Accessory has a sensor 65 which gains access inside of cover 40 through aperture 42 (which is not called out in FIG. 12 since it is filled with sensor 65). Sensor 65 can be any known type of sensor. Alternatively, element 65 is an actuator. To seal the accessory at the aperture in cover 40, an O-ring 66 can be provided in groove 66. Alternatively, any other type of known sealing configuration can be provided. The snap-fit relationship of the tabs of adapter 40 with accessory 64 provides sufficient downward force to deform the O-ring or other seal.

Figure 13:
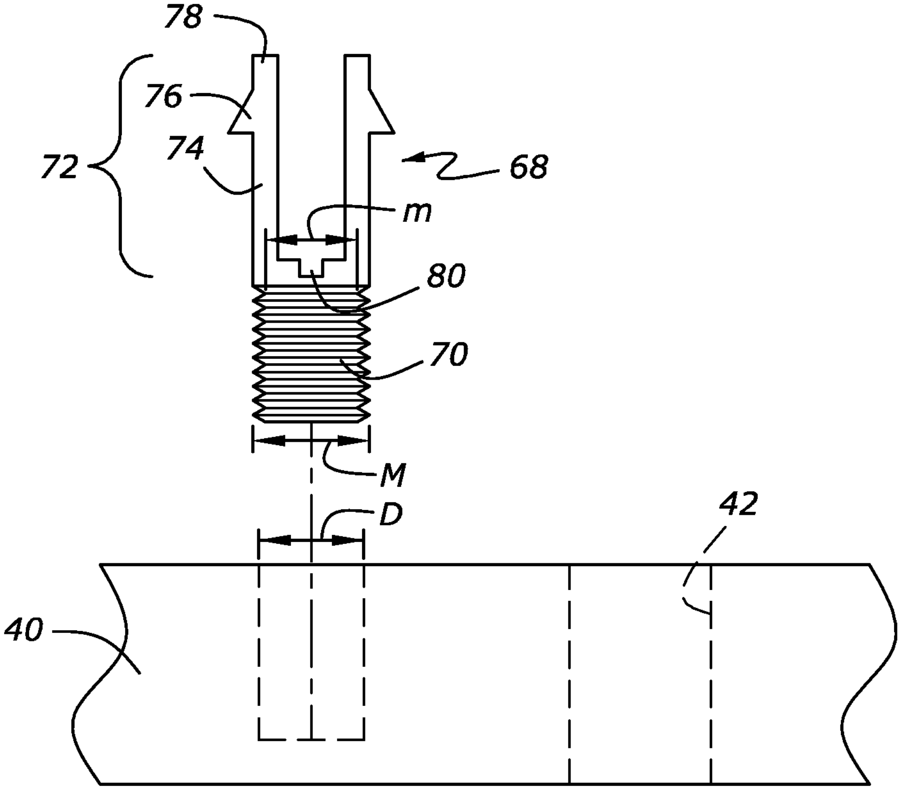
FIG. 13 is a fragmentary, elevation view of a cover and an adapter with the adapter being uninstalled.

Another embodiment of an adapter 68 is shown in FIG. 13. Connection section 70 comprises threads. Cylindrical cavity 44 of cover 40 has a diameter D. The threads on connection section have a major diameter, M, which is greater than D, and a minor diameter, m, which is less than D. Adapter 68 has tabs 72 which include: a proximate section 74, engagement section 76, and distal section 78. Connection section 70 has a drive feature 80 formed in the end of connection feature closer to tabs 72. Drive feature 80 can be any keyed arrangement such as: flat head, TORX, Allen, Phillips, etc, but shown as a flat head in FIG. 13. The threads on connection section 70 are self-tapping threads. By inserting adapter 68 into cylindrical cavity 44 as far as possible; placing a tool, such as tool 61 of FIG. 10 into drive feature 80; and rotating adapter 68 by such a tool, the self-tapping threads engage with the surface surrounding cylindrical cavity 44. Adapter 68 is pulled into cavity 44 until the threads are fully engaged.

Embodiments of the disclosure can be practiced otherwise than as specifically illustrated and described without departing from its spirit or scope. For example, while the present development has been described for mounting an ignition coil, those skilled in the art will appreciate that the present development can be used to attach various types of components within the scope of the development.

What is claimed is:

1. A method to manufacture a cover, comprising:

molding a cover body defining a cylindrical cavity of a predetermined diameter;

molding an adapter, configured to slidably engage the cylindrical cavity, the adapter having a connection section and tabs extending from the connection section in a direction generally parallel with an axis of the connection section and defining a drive feature in an end of the connection section proximate the tabs;

coupling a tool with the drive feature; and rotating the tool to rotate the adapter within the cylindrical cavity to couple the adapter with the cover body.

2. The method of claim 1 wherein the drive feature comprises one of an Allen, a TORX, a Phillips, and a flathead key and the tool is sized and shaped to cooperate with the drive feature so that a torque applied to the tool is transmitted to the adapter through the drive feature.

3. The method of claim 1 wherein the connection section is cylindrical and the rotating causes the adapter to be spin welded to the cover.

4. The method of claim 1 wherein the connection section comprises threads having a major diameter greater than the predetermined diameter and a minor diameter less than the predetermined diameter and the rotating causes the threads to engage with the cover body.

5. The method of claim 1 wherein at least one tab has a proximate section near the connection section of the adapter with the proximate section of the tab having nearly constant cross section along a length of the proximate section and an engagement section with a variable cross section along a length of the engagement section, a cross section of the engagement section being greatest at a position on the engagement section proximate the proximate section.

6. The method of claim 1 further comprising forming threads on the connection section having a major diameter greater than the predetermined diameter and a minor diameter less than the predetermined diameter.

7. The method of claim 1 wherein the cover comprises an engine cover.

8. A method of manufacturing a cover assembly, comprising:

molding a cover having a cylindrical cavity;

molding an adapter having a connection section with tabs extending outwardly therefrom and having an engagement section away from the connection section wherein the connection section includes a drive feature in an end proximate the tabs; and spin welding the adapter to the cover within the cylindrical cavity by applying torque to the drive feature.

9. The method of claim 8 further comprising:

forming a cross section of a proximate section of the tabs to be approximately constant in a direction parallel to a first axis; and forming the engagement section to include a first cross-section nearest a proximate section of the tabs and a second cross-section at a location farthest from the proximate section of the tabs with the first cross-section being greater than the second cross-section.

10. The method of claim 8 further comprising:

forming an aperture in the cover into which a portion of an engine accessory protrudes through the cover when installed such that a mounting orifice of the engine accessory couples with the tabs in a snap-fit relationship.

11. The method of claim 8 further comprising:

forming the connection section into a cylinder of diameter about equal to a diameter of the cylindrical cavity.

12. A method to manufacture a cover assembly, comprising:

molding a cover defining a cylindrical cavity of a predetermined diameter;

molding an adapter having a connection section provided with threads having a major diameter greater than the predetermined diameter and a minor diameter less than the predetermined diameter and tabs extending from the connection section in a direction generally parallel with an axis of the connection section, the adapter defining a drive feature in an end of the connection section proximate the tabs;

coupling a tool with the drive feature; and rotating the tool to rotate the adapter within the cylindrical cavity, wherein the rotation of the adapter causes the threads to engage with the cover to couple the adapter with the cover.

* * * * *